Dec. 18, 1923. 1,478,197
J. ARRENBRECHT
DEMOUNTABLE SPRING RIM FOR VEHICLE WHEELS
Filed March 10, 1923
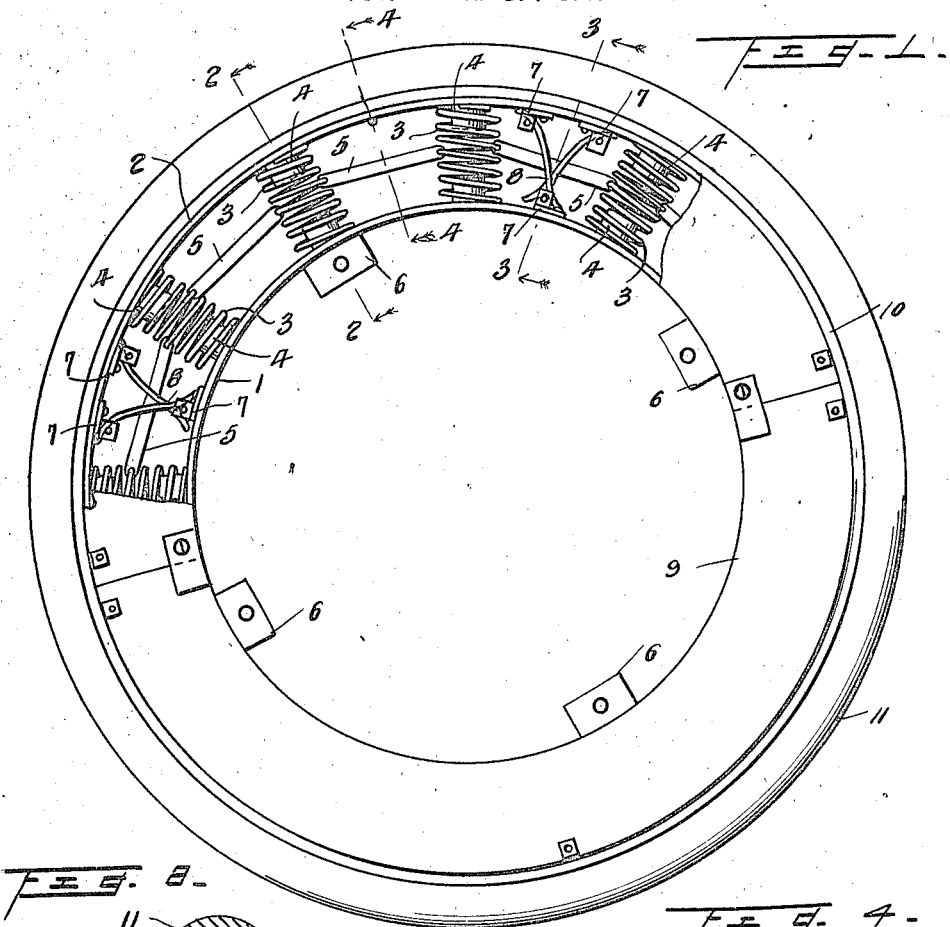
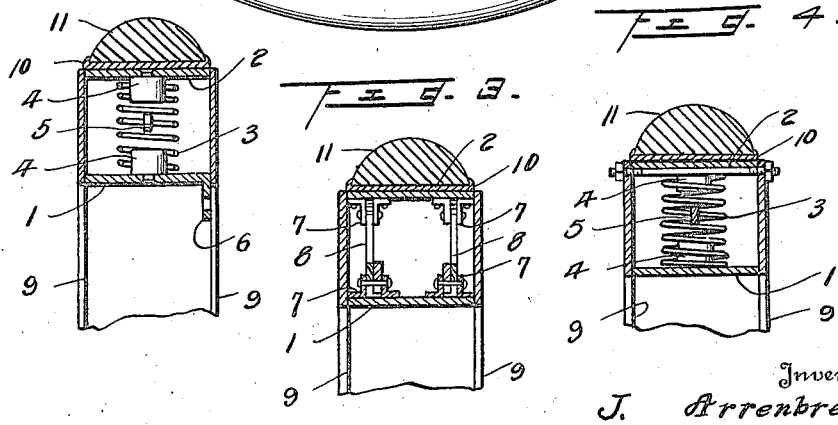
Inventor
J. Arrenbrecht.

Patented Dec. 18, 1923.

1,478,197

UNITED STATES PATENT OFFICE.

JOHN ARRENBRECHT, OF SALEM, OHIO.

DEMOUNTABLE SPRING RIM FOR VEHICLE WHEELS.

Application filed March 10, 1923. Serial No. 624,177.

*To all whom it may concern:*

Be it known that I, JOHN ARRENBRECHT, a citizen of the United States, residing at Salem, in the county of Columbiana and State of Ohio, have invented certain new and useful Improvements in Demountable Spring Rims for Vehicle Wheels; and I do hereby declare the following to be a full, clear, and exact description of the invention, such as will enable others skilled in the art to which it appertains to make and use the same.

The invention has for its object the provision of a spring rim adapted to be applied to vehicle wheels where a yielding tread is required to neutralize shock and vibration and minimize the wear and tear upon the vehicle and the motive plant and connections of a mechanically driven vehicle such as an automobile.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a portion of a demountable spring rim embodying the invention, parts being broken away, Figure 2 is a transverse section on the line 2—2 of Figure 1, Figure 3 is a cross section on the line 3—3 of Figure 1, and Figure 4 is a detail sectional view on the line 4—4 of Figure 1.

Corresponding and like parts are referred to in the following description and designated in the several views of the drawings by like reference characters.

The demountable rim comprises an inner ring 1 and an outer ring 2, the two rings being spaced apart any determinate distance. Expansible helical springs 3 are interposed between the two rings and are normally under tension, said springs being retained in place by means of lugs 4 applied to the rings. Links 5 disposed between adjacent springs 3 operate to hold said springs in the required position. Clips 6 attached to the inner ring 1 extends inwardly to serve as means for securing the rim as a whole to the felloe of the vehicle wheel, said clips being apertured to receive the securing bolts. Brackets 7 are applied to the rings 1 and 2 and links 8 are provided to coact with the brackets 7 and extend between the rings 1 and 2 and prevent relative circumferential or lateral displacement of the rings. Plates 9 are applied to opposite sides of the rings 1 and 2 and close the space formed between them, thereby protecting the springs and the several connections between the rings. The plates 9 are bolted to opposite sides of the outer ring 2 and loosely engage the sides of the inner ring 1. A band 10 is bolted or otherwise secured to the outer side of the ring 2 and has a tire 11 cemented or otherwise secured thereto.

The rim is designed to be applied to the vehicle wheel of an automobile to replace the usual pneumatic tire, thereby overcoming the objectionable features such as puncture, blowout and rim cut.

What is claimed is:

1. A demountable rim comprising spaced inner and outer rings, interposed expansible helical springs connecting the said rings, links between each two adjacent springs and having their ends pivotally connected to the adjacent springs, brackets applied to the rings, and crossed links pivoted to and coacting with the brackets and forming connecting means between the rings.

2. A demountable rim comprising spaced inner and outer rings, interposed expansible helical springs, connecting the said rings, links between each two adjacent springs, and said links having their ends pivotally connected to the adjacent springs, to hold the same in their required position.

In testimony whereof I affix my signature in presence of two witnesses.

JOHN ARRENBRECHT.

Witnesses:
 ISABELLE ISENSEE,
 F. B. HARRIS.